No. 666,250.  
I. ZELLWEGER.  
SWEEPER.  
(Application filed Apr. 4, 1898.)  
Patented Jan. 15, 1901.
(No Model.)
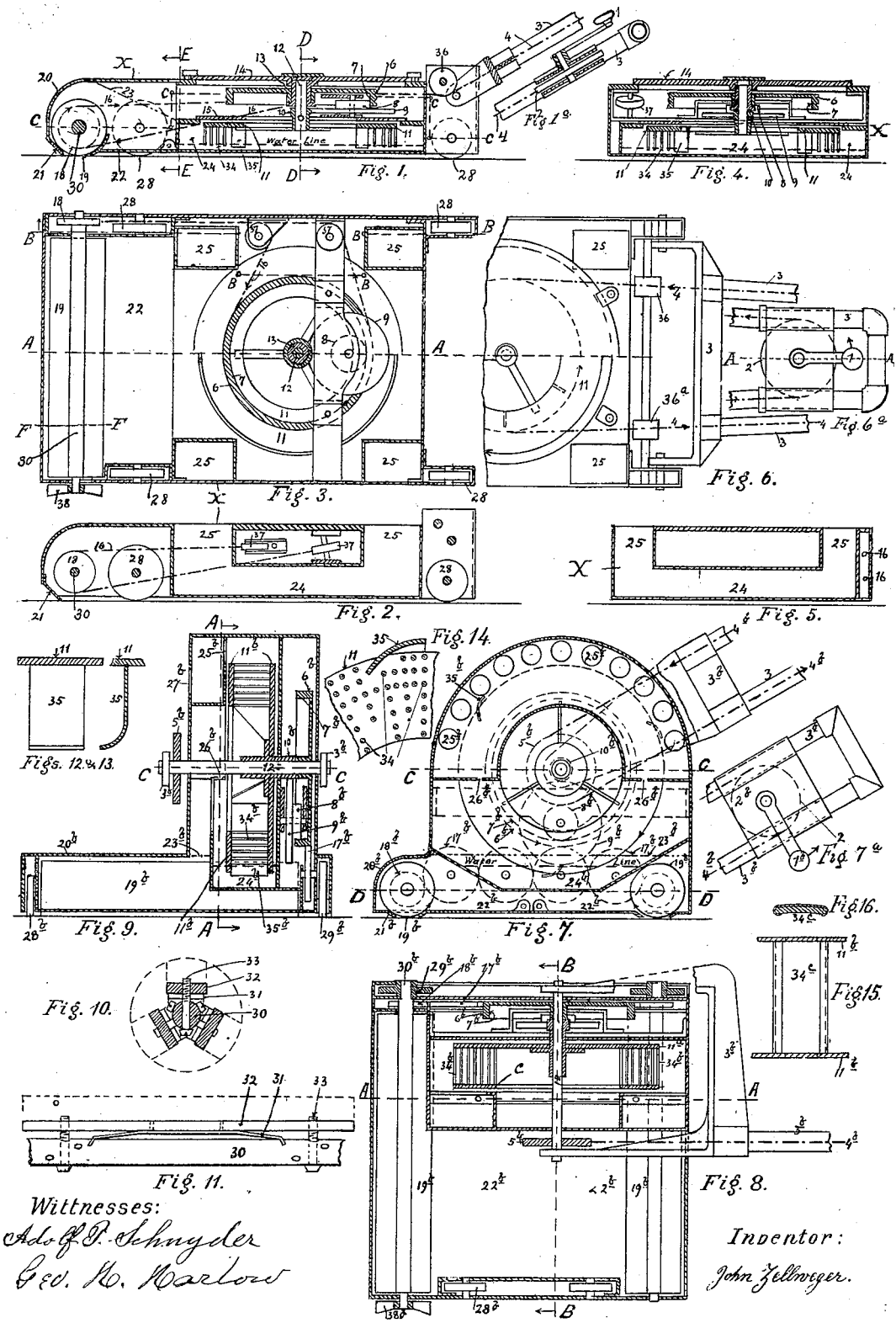
Wittnesses:  
Adolf P. Schnyder  
Geo. H. Marlow
Inventor:  
John Zellweger.

UNITED STATES PATENT OFFICE.

JOHN ZELLWEGER, OF ST. LOUIS, MISSOURI.

SWEEPER.

SPECIFICATION forming part of Letters Patent No. 666,250, dated January 15, 1901.

Application filed April 4, 1898. Serial No. 676,446. (No model.)

*To all whom it may concern:*

Be it known that I, JOHN ZELLWEGER, a citizen of the United States, residing at St. Louis, in the State of Missouri, have invented a new and useful Improvement in the Art of Sweeping and in Apparatus for Use in said Art, of which the following is a specification.

This invention relates to certain new and useful improvements in sweepers; and the novelty resides in the peculiar construction and combination of parts, all as more fully hereinafter described, shown in the drawings, and then particularly pointed out in the claims.

In the drawings both the preferred form and a modification of my apparatus are illustrated, in which—

Figure 1 represents a vertical longitudinal section of the preferred form of my apparatus on line A A, Fig. 3, with the outer end of its handle broken away. Fig. 1$^a$ is a vertical longitudinal section of the outer end of the handle of said apparatus and connecting parts on line A A, Fig. 6$^a$. Fig. 2 is a vertical longitudinal section of the same apparatus on line B B, Fig. 3. Fig. 3 is a horizontal section on line C C, Fig. 1, showing the cover 15 removed and the fan 11 in sight in the lower half thereof. Fig. 4 is a vertical cross-section on line D D, Fig. 1. Fig. 5 is a vertical cross-section on line E E, Fig. 1. Fig. 6 represents a plan view of the rear end of the sweeper with the front end thereof and the outer end of its handle broken away. Fig. 6$^a$ is a plan view of the outer end of the handle, shown broken away in Fig. 6. Fig. 7 is a vertical longitudinal section of a modification of my apparatus on line A A, Fig. 8, with the outer end of its handle broken away. Fig. 7$^a$ is a side elevation of the outer end of the handle of the apparatus illustrated in Figs. 7, 8, and 9. Fig. 8 is a horizontal transverse section on lines C C and D D of Fig. 7, with the outer end of the handle broken away. Fig. 9 is a vertical cross-section on line B B, Fig. 8. Fig. 10 represents a detailed cross-section on line F F, Fig. 3. Fig. 11 represents a detailed view in elevation of a brush-shaft and a section of a brush thereto attached. Figs. 12 and 13 respectively represent a front view and a vertical section of a scoop. Fig. 14 is a detailed view of a section of the preferred form of my fan. Figs. 15 and 16 respectively represent a modification of a detail in elevation and cross-section of the vanelet.

Similar letters and numerals refer to similar parts throughout the several views.

In the preferred form of my apparatus the housing X, Figs. 1 to 6$^a$, inclusive, is preferably supported upon rollers 28, and the operating parts preferably receive their motion from a crank 1, Figs. 1$^a$ and 6$^a$, secured to a pulley 2, rotating in bearings attached to the handle 3, used in propelling the apparatus and shown hinged thereto. The crank is designed to be turned by the hand of the operator. From the pulley 2 an endless chain 4 is shown passing down through the hollow handle 3 to a sheave 36, beneath which it passes, and thence runs to the groove 6 of a double-grooved drive-wheel 7, passes around said drive-wheel, then runs under a sheave 36$^a$, Fig. 6, and back up the handle 3 to the pulley 2. From the drive-wheel 7 power may be transmitted by means of gears 8, 9, and 10 to a fan and dasher 11, attached to an axle 12, journaled in the hollow shaft 13, on which the driver 7 turns and which is preferably attached to and supported by the removable top 14 of the housing X.

The combined fan and dasher 11 preferably has attached to its back a means for creating a current of air through the purifying-chamber and at the same time dashing the water in said chamber up into a spray and not only washing the air passing through the chamber, but wetting its own surfaces, so as to adapt them to catch dust suspended in the air through which they pass when the fan is rotated. The means which I prefer to use for this purpose are a series of vanelets 34, preferably, but not necessarily, in the form of pins, Figs. 1, 4, and 14, and a series of scoops 35, Figs. 12 and 13, both preferably projecting into the water in the bottom of the purifying-chamber and the scoops preferably reaching or projecting beyond the zone of rotation of the vanelets, so that when the fan is revolved the water in the bottom of the chamber will be dashed up both by the scoops and vanelets. The scoops and vanelets are not only kept moist in this way, but the dust which lodges on them is washed down into the body of the water in said chamber. The rapid rotation of the pins 34 and scoop 35 through the air passing through the chamber in which they are located greatly assists them in catching dust. The surfaces of the vanelets 34 and the scoop 35 may be formed of an absorbent material; but that is not essential.

In the preferred form of my apparatus motion is transmitted from the driver 7, preferably by means of an endless belt 16, which is preferably guided by sheaves 37, Fig. 2, to and from a sheave 18, attached to the brush-shaft 30. Any cylindrical brush may be used; but I prefer to use the form of brush illustrated in detail in Figs. 10 and 11, in which three brush-sections 32 are shown secured to the shaft 30 by means of bolts 33, so as to be free to move to and from the shaft 30 within limits, and they rest against elastic backings 31, interposed between them and the shaft 30, and which tend to keep them in position. The brush-shaft 30 may be made to project beyond the housing X, and an auxiliary brush 38, Fig. 3, may be attached to it outside of said housing for use in dusting; but such an auxiliary brush, though useful under certain circumstances, is not essential. The main brush attached to the shaft 30 rotates within a dust-box 20, open at the bottom, so as to allow the brush to act upon the surface to be swept. In front of said brush a flexible apron 21 preferably drags over the floor, and back of the brush a dust-pan 22 is arranged. I prefer to cause the brush to rotate so as to carry the dust collected forward and against the apron 21 and carry it thence up and around and throw it back into the dust-pan. The main brush and the fan 11 are set in motion at the same time, and the latter creates a suction which draws air in from around the front end of the sweeper, as well as directly beneath it, and thus prevents dust from rising into the room. The dust-ladened air sucked into the sweeper passes from the brush-box 20 through a screen 23, designed to intercept large particles, and then enters the purifying-chamber 24, preferably through the central opening left in the top 15 thereof. It then passes through the purifying-chamber and escapes through flues 25, which in the preferred form of my device lead up from said purifying-chamber and discharge the purified air through the top of the sweeper, Figs. 2, 3, 5, and 6.

In the modification of my apparatus illustrated in Figs. 7, 7$^a$, 8, and 9 the handle 3$^b$, crank 1$^b$, pulley 2$^b$, and driver 7$^b$ are similar to the corresponding parts in the preceding figures, except that they are arranged in vertical planes. So, also, power is transmitted in the case of the mechanism shown from the pulley 2$^b$ to the internal mechanism of the sweeper by means of an endless chain 4$^b$, which passes over a sheave 5$^b$, attached to a horizontal driving-shaft 12$^b$, to which a gear-wheel 7$^b$ and a fan 11$^b$ are also attached. The fan 11$^b$ rotates in a vertical plane and differs from the fan 11 in having its back formed of a disk instead of a ring and in having the vanelets 34$^b$ and scoops 35$^b$ arranged between said back and a ring $c$ attached to said back. The fan 11$^b$ dips edgewise into water placed in the bottom of the purifying-chamber 24$^b$. The machine preferably runs on rollers 28$^b$ and is provided with two brushes 19$^b$, both sweeping inwardly toward the dust-pan 22$^b$, and also an auxiliary brush 38$^b$. To each brush-shaft 30$^b$ a pinion 18$^b$ is attached, and motion is transmitted to the brushes from the gear-wheel 7$^b$ through the pinions 17$^b$ and said pinions 18$^b$. A screen 23$^b$ prevents large particles of dirt from passing to the purifying-chamber, and air, with its finer particles of dust, passes through said screen and into said purifying-chamber through an opening in one side thereof and escapes from said chamber through openings 25$^b$ and out of the apparatus through openings 27$^b$.

In Figs. 15 and 16 I have shown a modified form of vanelet 34$^c$, consisting of a metal strip preferably covered on the inner side with a piece of fabric and with its sides turned in and over the edges of the fabric, so as to form a trough to hold the lining and water.

In the modification shown in Figs. 7, 8, and 9 the ends of the brush-shafts 30$^b$ are preferably journaled in the hollow trunnions of the rollers 29$^b$, as shown most clearly in Fig. 8.

I desire to cover equivalents broadly.

I claim—

1. In a sweeping apparatus, a casing, means for sweeping; a receptacle for coarse sweepings; an air-purifying chamber having an air-inlet; and exit-flues leading through the top of the device and a water-tight bottom; and a rotary fan having dust-catching portions for sucking air into the sweeper and forcing it to pass through said purifying-chamber, and for presenting moistened surfaces and liquid in the form of spray thereto, in its passage through said chamber.

2. In a sweeping apparatus, a casing, rotary means for sweeping; a receptacle for coarse sweepings; an air-purifying chamber; having exit-flues leading through the top of the sweeper, a screen between said receptacle and said chamber; and a rotary device having dust-catching portions for drawing air into said apparatus, forcing it through said chamber and presenting liquid in the form of spray and moistened surfaces thereto in its passage through said chamber.

3. The combination in a sweeping apparatus, of a casing, an air-purifying chamber having an air-inlet and an air-outlet and a water-tight bottom for liquid; and a rotary fan arranged in said chamber, and having dust-catching portions so that when the chamber is charged with liquid the fan will project into the liquid, and the dust removed from said portions, and when it is rotated, dash the liquid up, as well as tend to force a current of air to pass through said chamber.

4. The combination in a sweeping apparatus; a casing, a rotary brush for sweeping;

means for propelling the sweeper, a fan in the air-purifying chamber and interposed between the brush and said means, and means independent of the propelling means for operating the brush when the apparatus is stationary.

5. The combination in a sweeping apparatus, of a casing, a rotary brush; a handle for propelling the sweeper, a fan arranged within the purifying-chamber of the casing between the brush and handle; means independent of the propelling means carried by the handle for applying hand-power to the operation of the brush and fan and means for transmitting power from the power device carried by the handle of the sweeper to the brush.

6. The combination in a sweeping apparatus, of a rotary brush, a dust-box, an apron in front of the brush; a dirt-receptacle back of the brush, a rotary fan in said receptacle and provided with dust-catching portions, and means for causing the brush to sweep dirt and dust forward against said apron and carry it around over itself and deposit the heavier particles in said receptacle.

7. A sweeper having a rotary brush in a brush-chamber open at bottom for brush to project through, a rotary fan in a fan-chamber, constructed to form a spray in said chamber, provided with inlet and outlet openings for air near center and circumference of the fan respectively; an air passage or duct communicating with the brush-chamber and the inlet to the fan-chamber, means for containing a body of water in the bottom of the fan-chamber; and suitable mechanism to drive the brush and the fan simultaneously, and a casing inclosing said parts, as set forth.

8. A sweeper, having a casing, a rotary brush in a brush-chamber open at bottom for brush to project through; a rotary fan constructed to form spray and arranged in a fan-chamber provided with inlet and outlet openings for air near center and circumference of the fan respectively; an air passage or duct communicating with the brush-chamber and with the inlet to the fan-chamber; a drive-wheel connected by gearing or endless rope, belt or chain to a wheel fixed on the shaft of a brush and by an endless rope, belt or chain to an auxiliary drive-wheel at upper end of a handle to the sweeper and provided with a crank, substantially as set forth.

JOHN ZELLWEGER.

Witnesses:
ADOLF P. SCHNYDER,
GEO. H. HARLOW.